(12) United States Patent
Son et al.

(10) Patent No.: US 9,217,079 B2
(45) Date of Patent: Dec. 22, 2015

(54) LONG FIBER-REINFORCED THERMOPLASTIC RESIN COMPOSITION HAVING IMPROVED IMPACT RESISTANCE AND MOLDED ARTICLE USING THE SAME

(71) Applicants: HYUNDAI MOBIS CO., LTD., Seoul (KR); GS Caltex Corporation, Seoul (KR)

(72) Inventors: Chang Wan Son, Yongin-si (KR); Hyeon Don Kim, Yongin-si (KR); Eun Seon Jeon, Yongin-si (KR); Yong Chun, Suwon-si (KR); Ha Kyu Seo, Daejeon (KR); Seung Hyun Lee, Daejeon (KR); Woong Jae Boo, Namyangju-si (KR)

(73) Assignees: HYUNDAI MOBIS CO., LTD., Seoul (KR); GS CALTEX CORPORATION, Seoul (KR)

( * ) Notice: Subject to any disclaimer, the term of this patent is extended or adjusted under 35 U.S.C. 154(b) by 0 days.

(21) Appl. No.: 14/553,508

(22) Filed: Nov. 25, 2014

(65) Prior Publication Data

US 2015/0159003 A1    Jun. 11, 2015

(30) Foreign Application Priority Data

Dec. 10, 2013    (KR) ........................ 10-2013-0152988

(51) Int. Cl.
*C08L 23/16*    (2006.01)

(52) U.S. Cl.
CPC ...................................... *C08L 23/16* (2013.01)

(58) Field of Classification Search
CPC ....................................................... C08L 23/16
See application file for complete search history.

(56) References Cited

U.S. PATENT DOCUMENTS

| 5,373,046 A * | 12/1994 | Okamura | .................. C08J 3/226 524/413 |
| 2007/0249761 A1* | 10/2007 | Guymon | ............ B65D 21/0223 524/59 |
| 2010/0210780 A1* | 8/2010 | Sugimoto | ............... C08L 23/10 524/451 |

FOREIGN PATENT DOCUMENTS

| KR | 10-2005-0093186 A | 9/2005 |
| KR | 1020005009318 A * | 9/2005 |

* cited by examiner

*Primary Examiner* — Robert Harlan
(74) *Attorney, Agent, or Firm* — Knobbe Martens Olson & Bear LLP

(57) ABSTRACT

A long fiber-reinforced thermoplastic resin composition having improved impact resistance, includes: (A) a long fiber reinforcement; (B) an ethylene-propylene copolymer; (C) a first thermoplastic elastomer; (D) a second thermoplastic elastomer; (E) a functional group-grafted modified polypropylene resin; and (F) an inorganic filler.

14 Claims, No Drawings

LONG FIBER-REINFORCED THERMOPLASTIC RESIN COMPOSITION HAVING IMPROVED IMPACT RESISTANCE AND MOLDED ARTICLE USING THE SAME

CROSS-REFERENCES TO RELATED APPLICATIONS

This application claims the benefit of Korean Patent Application No. 10-2013-0152988, filed on Dec. 10, 2013 in the Korean Intellectual Property Office, the entire disclosures of which are incorporated herein by reference.

BACKGROUND

Exemplary embodiments of the present invention relate to a long fiber-reinforced thermoplastic resin composition having improved impact resistance and a molded article made therefrom. More specifically, exemplary embodiments of the present invention relate to a long fiber-reinforced thermoplastic resin composition having improved impact resistance, which has excellent mechanical strength such as excellent impact resistance as well as excellent lightweight properties, can be designed as thin films, and thus has high economic efficiency, and to a molded article made therefrom.

Automotive interior parts are mainly made of a resin or fiber presenting a soft image in order to increase pleasant feelings when getting on the car. Among automotive interior parts, a crash pad (C/Pad), also called "instrument panel" or "dash board", is attached to the bottom of the glass in front of the driver's seat and comprises a device capable of receiving a cluster of meters, including a speed meter, a fuel gauge and a water temperature gauge, an air conditioning system, a radio, a clock, an ashtray and an small article. This crash pad can be divided into two types: a foam type and an integrated hard type. Particularly, because the crash pad may be required to be operated during driving, it is a very important part in terms of design convenience and safety and is required to satisfy basic conditions including impact resistance, chemical resistance and moldability, as well as reduced thickness and lightweight.

Thus, automotive interior parts such as crash pads have been made of either a mixture of polycarbonate and an acrylonitrile-butadiene-styrene copolymer (ABS), or an engineering plastic (EP) material obtained by reinforcing an acrylonitrile-butadiene-styrene copolymer with glass fiber (GF).

SUMMARY

An aspect of the present invention relates to a long fiber-reinforced thermoplastic resin composition having improved impact resistance. In one embodiment, the long fiber-reinforced thermoplastic resin composition having improved impact resistance includes: (A) about 10 wt % to about 23 wt % of a long fiber reinforcement; (B) about 50 wt % to about 77 wt % of an ethylene-propylene copolymer; (C) about 5 wt % to about 18 wt % of a first thermoplastic elastomer having a melt index of about 1.0 g/10 min to about 5.0 g/10 min, as measured at a temperature of 230° C. and a load of 2.16 kg; (D) about 5 wt % to about 18 wt % of a second thermoplastic elastomer having a melt index of about 30 g/10 min to about 60 g/10 min, as measured at a temperature of 230° C. and a load of 2.16 kg; (E) about 0.05 wt % to about 7 wt % of a functional group-grafted modified polypropylene resin; and (F) about 0.5 wt % to about 5 wt % of an inorganic filler, wherein each of the first thermoplastic elastomer (C) and the second thermoplastic elastomer (D) includes at least one of a copolymer of ethylene with an alpha-olefin having 4 or more carbon atoms, and a styrene-diene copolymer.

In one embodiment, the ethylene-propylene copolymer (B) is a mixture of (B1) a first ethylene-propylene copolymer having a melt index of about 0.1 g/10 min to 2.0 g/10 min, as measured at a temperature of 230° C. and a load of 2.16 kg, and (B2) a second ethylene-propylene copolymer having a melt index of about 30 g/10 min to about 60 g/10 min, as measured at a temperature of 230° C. and a load of 2.16 kg.

In one embodiment, the long-fiber reinforcement (A) is at least one selected from among glass fiber, carbon fiber, polymer fiber, basalt fiber, natural fiber and metal fiber.

In one embodiment, the long fiber reinforcement (A) includes about 1 wt % to about 3 wt % of a binder.

In one embodiment, each of the first ethylene-propylene copolymer (B1) and the second ethylene-propylene copolymer (B2) includes ethylene in an amount of about 10 wt % to about 15 wt %.

In one embodiment, the first ethylene-propylene copolymer (B1) and the second ethylene-propylene copolymer (B2) are included at a weight ratio of about 1:0.5 to about 1:3.

In one embodiment, the first thermoplastic elastomer (C) and the second thermoplastic elastomer (D) are included at a weight ratio of about 1:0.5 to about 1:3.

In one embodiment, the functional group in the functional group-grafted modified polypropylene resin (E) is at least one of unsaturated carboxylic acid, unsaturated carboxylic acid derivatives and organosilane compounds.

In one embodiment, the functional group-grafted modified polypropylene resin (E) has a graft ratio of about 5 wt % to about 15 wt %.

In one embodiment, the organic filler (F) includes at least one of (F1) a fibrous inorganic filler and (F2) a non-fibrous inorganic filler, wherein the fibrous inorganic filler (F1) includes at least one of glass fiber, carbon fiber and metal fiber, which have a number-average fiber length (L) of about 1 mm to about 5 mm, and the non-fibrous inorganic filler (F2) includes at least one of talc, calcium carbonate, barium sulfate, glass bubbles and glass beads, which have a number-average particle size of about 0.1 μm to about 5 μm.

Another aspect of the present invention relates to a molded article comprising the above-described long fiber-reinforced thermoplastic resin composition.

In one embodiment, fiber remaining in the molded article has a number-average residual fiber length of about 1.2 mm to about 5 mm.

The molded article is an automotive crash pad.

In one embodiment, fiber remaining in the automotive crash pad has a number-average residual fiber length of about 1.2 mm to about 5 mm.

DESCRIPTION OF SPECIFIC EMBODIMENTS

In the following description, the detailed description of related known technology or configuration will be omitted when it may obscure the subject matter of the present invention. In addition, the terms of constituent elements, which will be described hereinafter, are defined in consideration of their functions in the present invention and may be changed according to the intention of a user or an operator, or according to the custom. Accordingly, definitions of these terms must be based on the overall description herein.

A long fiber-reinforced thermoplastic polymer material obtained by reinforcing an acrylonitrile-butadiene-styrene copolymer with glass fiber has advantages including possible recycling and easy molding, and excellent physical properties, including excellent mechanical properties and a low linear expansion coefficient, compared to a short fiber-reinforced polymer material, and thus is used in a wide range of industrial applications, including electric home appliances and construction materials. Particularly, it is increasingly used in the automobile industry that requires lightweight and recycling properties. Although the long fiber-reinforced thermoplastic polymer material has excellent physical properties, the chemical resistance and recycling properties thereof are inferior to those of polyolefinic resins, particularly propylene-based resins, and thus the long fiber-reinforced thermoplastic polymer material has been gradually replaced with a polypropylene resin composition.

In addition, as a core material for the crash pad, PPF (that is a composite material obtained by adding an inorganic filler such as talc to PP) has recently been increasingly used in terms of a reduction in the cost and weight of the crash pad. However, it is difficult to reduce the content of talc in PPF in order to ensure the physical properties of the product, and PPF is required to have a specific thickness or larger in order to ensure the reliability of the product, indicating that the use of PPF makes it difficult to reduce the thickness of the product. The application of the Mucell process in terms of a reduction in weight was reported, but in this case, there were problems, including a poor appearance and difficult molding, and a reduction in physical properties still occurred, and thus the spreading of the Mucell process to the whole industry was insignificant.

An aspect of the present invention relates to a long fiber-reinforced thermoplastic resin composition having improved impact resistance. In one embodiment, the long fiber-reinforced thermoplastic resin composition having improved impact resistance includes: (A) a long fiber reinforcement; (B) an ethylene-propylene copolymer; (C) a first thermoplastic elastomer; (D) a second thermoplastic elastomer; (E) a functional group-grafted modified polypropylene resin; and (F) an inorganic filler.

In one embodiment, the first thermoplastic elastomer (C) and the second thermoplastic elastomer (D) include at least one of a copolymer of ethylene with an alpha-olefin having 4 or more carbon atoms, and a styrene-diene copolymer.

Hereinafter, the long fiber-reinforced thermoplastic resin composition having improved impact resistance according to the present invention will be described in detail.

(A) Long Fiber Reinforcement

The long fiber reinforcement (A) may be included for the purpose of improving the impact resistance and mechanical properties of the long fiber-reinforced thermoplastic resin composition while ensuring the lightweight properties of the composition.

The long fiber reinforcement (A) may have a fibrous or bundle structure having a cylindrical, oval or polygonal cross-sectional shape.

Examples of the long fiber reinforcement (A) that is used in the present invention include glass fiber, carbon fiber, polymer fiber, basalt fiber, natural fiber, metal fiber or the like. These fibers may be used alone or in a mixture of two or more, but are not limited thereto.

In one embodiment, the glass fiber may be E glass, ECR glass having improved corrosion resistance, S,S-2,R,T glass having high strength, C.A glass having acid resistance, or the like.

In one embodiment, the long fiber reinforcement (A) may have an average fiber length (L) of about 8 mm to about 12 mm. In this condition, the long fiber-reinforced thermoplastic resin composition can have excellent flowability and moldability, and the impact resistance and mechanical strength thereof can be ensured. For example, the average fiber length may be about 8, 8.5, 9, 9.5, 10, 10.5, 11, 11.5 and 12 mm. Also, the long fiber reinforcement (A) may have a cross-sectional diameter of about 6 μm to about 20 μm. In this condition, the long fiber-reinforced thermoplastic resin composition can have excellent flowability and moldability, and the impact resistance and mechanical strength thereof can be ensured. For example, the cross-sectional diameter may be about 6, 7, 8, 9, 10, 11, 12, 13, 14, 15, 16, 17, 18, 19 and 20 μm.

In one embodiment, the long fiber reinforcement (A) may include a binder in order to prevent breakage of fibers and to ensure the binding properties of fibers. Examples of the binder that is used in the present invention include epoxysilane, aminosilane, amidesilane, azidesilane, acrylsilane, or the like.

The binder may be included in an amount ranging from about 1 wt % to about 3 wt % based on the total weight of the long fiber reinforcement (A). In this range, the long fiber reinforcement (A) may have excellent binding properties, and the composition of the present invention may have excellent impact resistance, moldability and dispersibility. For example, the content of the binder may be about 1, 1.5, 2, 2.5 and 3 wt %.

The long fiber reinforcement (A) is included in an amount of about 10 wt % to about 23 wt % based on the total weight of the long fiber-reinforced thermoplastic resin composition. If the long fiber reinforcement (A) is included in an amount of less than about 10 wt %, the effect of reinforcing the mechanical properties of the composition and the impact resistance of the composition will be reduced, and if it is included in an amount of more than about 23 wt %, the flowability, moldability and appearance characteristics of the long fiber-reinforced thermoplastic resin composition can be reduced, and the specific gravity of the composition of the present invention can increase, resulting in a decrease in the lightweight properties. In one embodiment, the long fiber reinforcement (A) may be included in an amount of about 15 wt % to about 21 wt % based on the total weight of the long fiber-reinforced thermoplastic resin composition. For example, it may be included in amounts of about 10, 11, 12, 13, 14, 15, 16, 17, 18, 19, 20, 21, 22 and 23 wt %.

(B) Ethylene-Propylene Copolymer

The ethylene-propylene copolymer (B) may be included for the purpose of ensuring the mechanical strengths (e.g., impact resistance, heat resistance, etc.) of the long fiber-reinforced thermoplastic resin composition having improved impact resistance.

The ethylene-propylene copolymer (B) that is used in the present invention may be an ethylene-propylene copolymer alone or a mixture of two or more ethylene-propylene copolymers having different melt indices.

In one embodiment, when the ethylene-propylene copolymer (B) is used alone, it may have a melt index of about 0.1 g/10 min to about 60 g/10 min, as measured at a temperature of 230° C. and a load of 2.16 kg.

In one embodiment, when the ethylene-propylene copolymer (B) is a mixture of two or more ethylene-propylene copolymers, it may be composed of a mixture of (B1) a first ethylene-propylene copolymer having a melt index of about 0.1 g/10 min to about 2.0 g/10 min, as measured at a temperature of 230° C. and a load of 2.16 kg, and (B2) a second ethylene-propylene copolymer having a melt index of about 30 g/10 min to about 60 g/10 min, as measured at a temperature of 230° C. and a load of 2.16 kg. When the ethylene-propylene copolymer (B) satisfying such conditions is used in the present invention, the composition has excellent impact strength and physical strengths. The melt index of the first ethylene-propylene copolymer (B1) may be, for example, about 0.1, 0.2, 0.3, 0.4, 0.5, 0.6, 0.7, 0.8, 0.9, 1, 1.5, and 2.0 g/10 min. The melt index of the first ethylene-propylene copolymer (B2) may be, for example, about 30, 35, 40, 45, 50, 55 and 60 g/10 min.

In the present invention, each of the first ethylene-propylene copolymer (B1) and the second ethylene-propylene copolymer (B2) may be included in an amount of about 10 wt % to about 15 wt %. For example, each of these copolymers may be included in an amount ranging from about 12 wt % to about 15 wt %. In this range, the composition has excellent moldability and is preferable in terms of a balance between impact strength and flowability.

In one embodiment, the first ethylene-propylene copolymer (B1) and the second ethylene-propylene copolymer (B2) may be included at a weight ratio of about 1:0.5 to about 1:3. For example, these copolymers may be included at a weight ratio ranging from about 1:0.8 to about 1:2. In this range, the composition has excellent moldability and is preferable in terms of a balance between impact strength and flowability.

In one embodiment, the ethylene-propylene copolymer (B) is included in an amount of about 50 wt % to about 77 wt % based on the total weight of the long fiber-reinforced thermoplastic resin composition. If the ethylene-propylene copolymer (B) is included in an amount of less than about 50 wt %, the toughness and impact resistance of the composition can be reduced, and if it is included in an amount of more than about 77 wt %, the toughness and impact resistance of the long fiber-reinforced thermoplastic resin composition can be reduced. In one embodiment, the ethylene-propylene copolymer (B) may be included in an amount of about 55 wt % to about 70 wt % based on the total weight of the long fiber-reinforced thermoplastic resin composition. For example, it may be included in amounts of about 50, 51, 52, 53, 54, 55, 56, 57, 58, 59, 60, 61, 62, 63, 64, 65, 66, 67, 68, 69, 70, 71, 72, 73, 74, 75, 76 and 77 wt %.

(C) First Thermoplastic Elastomer

The first thermoplastic elastomer (C) may be include in order to ensure the processability, rebound resilience, heat resistance and impact resistance of the composition of the present invention.

The first thermoplastic elastomer (C) may include at least one of a copolymer of ethylene with an alpha-olefin having 4 or more carbon atoms, and a styrene-diene copolymer.

In one embodiment, the copolymer of ethylene with an alpha-olefin having 4 or more carbon atoms may be an ethylene butane-1 copolymer (EBM) or an ethylene octene-1 copolymer (EOM) and may have an alpha-olefin content of about 12 wt % to about 45 wt %.

The styrene monomer in the styrene-diene copolymer may be styrene, α-methylstyrene, α-ethylstyrene, or p-methylstyrene, and the diene monomer may be butadiene, isoprene, or a combination thereof. When such components are used, the composition may have excellent processability, impact resistance, rebound resilience and heat resistance.

In one embodiment, the styrene-diene copolymer may be at least one copolymer of a styrene-butylene-styrene block copolymer, a styrene-ethylene-butylene-styrene block copolymer, a styrene-isoprene-styrene block copolymer, a styrene-ethylene-propylene block copolymer and a styrene-ethylene-propylene-styrene block copolymer.

In one embodiment, the first thermoplastic elastomer (C) may be a thermoplastic elastomer having a melt index of about 1.0 g/10 min to about 5.0 g/10 min, as measured at a temperature of 230° C. and a load of 2.16 kg. At this melt condition, the composition will have excellent moldability. If the melt index is less than about 1.0 g/10 min, the composition will have poor flowability and dispersibility, and if the melt index is about 5.0 g/10 min, the impact resistance and surface impact resistance of the composition can be reduced. For example, the melt index may be about 1.0, 1.5, 2.0, 2.5, 3.0, 3.5, 4.0, 4.5 and 5.0 g/10 min.

In one embodiment, the first thermoplastic elastomer (C) is included in an amount of about 5 wt % to about 18 wt % based on the total weight of the long fiber-reinforced thermoplastic resin composition. If the first thermoplastic elastomer (C) is included in an amount of less than about 5 wt %, the impact resistance of the composition can be reduced, and if it is included in an amount of more than about 18 wt %, the flowability and dispersion of the composition of the present invention can be reduced. In one embodiment, the first thermoplastic elastomer (C) may be included in an amount of about 10 wt % to about 15 wt % based on the total weight of the long fiber-reinforced thermoplastic resin composition. For example, it may be included in an amount of about 10 wt % to about 13 wt %. For example, it may be included in amounts of about 5, 6, 7, 8, 9, 10, 11, 12, 13, 14, 15, 16, 17 and 18 wt %.

(D) Second Thermoplastic Elastomer

The second thermoplastic elastomer (D) may be included in order to ensure the flowability, moldability, rebound resilience, heat resistance and impact resistance of the composition of the present invention.

In one embodiment, the second thermoplastic elastomer (D) may include a copolymer of ethylene with an alpha-olefin having 4 or more carbon atoms, or a styrene-diene copolymer. Herein, the copolymer of ethylene with an alpha-olefin having 4 or more carbon atoms, and the styrene-diene copolymer may be the same as described above with respect to the first thermoplastic elastomer (C).

In one embodiment, the second thermoplastic elastomer (D) may be a thermoplastic elastomer having a melt index of about 30 g/10 min to about 60 g/10 min, as measured at a temperature of 230° C. and a load of 2.16 kg. At this melt index, the composition will have excellent moldability and impact resistance. If the melt index is less than about 30 g/10 min, the flowability and dispersion of the composition can be reduced, and if the melt index is more than about 60 g/10 min, the impact resistance of the composition can be reduced. For example, the melt index may be about 30, 35, 40, 45, 50, 55, and 60 g/10 min.

In one embodiment, the second thermoplastic elastomer (D) is included in an amount of about 5 wt % to about 18 wt % based on the total weight of the long fiber-reinforced thermoplastic resin composition. If the second thermoplastic elastomer (D) is included in an amount of less than about 5 wt %, the impact resistance and surface impact resistance of the composition can be reduced, and if it is included in an amount of more than about 18 wt %, the toughness of the composition can be reduced. In one embodiment, the second thermoplastic elastomer may be included in an amount of about 10 wt % to about 15 wt % based on the total weight of the long fiber-reinforced thermoplastic resin composition. For example, it may be included in an amount of about 10 wt % to about 13 wt %. For example, it may be included in amounts of about 5, 6, 7, 8, 9, 10, 11, 12, 13, 14, 15, 16, 17 and 18 wt %.

The first thermoplastic elastomer (C) and the second thermoplastic elastomer (D) may be included at a weight ratio of about 1:0.5 to about 1:3. For example, they may be included at a weight ratio ranging from about 1:0.8 to about 1:1.5. In this range, the composition of the present invention will have excellent processability, moldability, rebound resilience, heat resistance and impact resistance.

(E) Functional Group-Grafted Modified Polypropylene Resin

The functional group-grafted modified polypropylene resin (E) may be included for the purpose of ensuring the processability, compatibility, water content and brittleness of the composition of the present invention.

In one embodiment, the functional group-grafted modified polypropylene resin (E) may comprise at least one functional group, selected from among unsaturated carboxylic acid, unsaturated carboxylic acid derivatives and organosilane compounds, grafted into the main chain or end of the polypropylene resin.

In one embodiment, examples of the unsaturated carboxylic acid include, but are not limited to, acrylic acid, methacrylic acid, crotonic acid, maleic acid, fumaric acid, itaconic acid, citraconic acid and mesaconic acid.

Examples of the unsaturated carboxylic acid derivatives include, but are not limited to, anhydrides such as maleic anhydride and itaconic anhydride, and esters, amides and metal salts, including maleic acid monoamide, acrylic acid amide, and sodium methacrylate.

Examples of the organosilane compound include, but are not limited to, aminosilane, epoxysilane, methacryloxysilane, methylchlorosilane, phenylchlorosilane, methyltriethoxysilane, dimethyldiethoxysilane, methyltris(2-methoxysilane)-silane, vinyltris(2-methoxyethoxy)-silane, isobutyltriethoxysilane, and isobutyltrimethoxysilane.

In one embodiment, the functional group-grafted modified polypropylene resin (E) may have a graft ratio of about 5 wt % to about 15 wt %. For example, the graft ratio may be in the range of about 5 wt % to about 10 wt %. In this range, the coupling of the composition of the present invention with other components can be improved, and thus the composition can have excellent processability and physical properties.

In one embodiment, the functional group-grafted modified polypropylene resin (E) is included in an amount of about 0.05 wt % to about 7 wt % based on the total weight of the long fiber-reinforced thermoplastic resin composition. If the functional group-grafted modified polypropylene resin (E) is included in an amount of less than about 0.05 wt %, it will be difficult to ensure the compatibility, water content and brittleness of the composition of the present invention, and if it is included in an amount of more than about 7 wt %, the toughness and impact resistance of the composition can be reduced. For example, it may be included in an amount of about 0.1 wt % to about 5 wt %. For example, it may be included in amounts of about 0.05, 0.1, 0.5, 1, 1.5, 2, 2.5, 3, 3.5, 4, 4.5, 5, 5.5, 6, 6.5 and 7 wt %.

(F) Inorganic Filler

The inorganic filler (F) may be included for the purpose of improving the toughness and impact resistance of the composition of the present invention.

In the present invention, the inorganic filler (F) may include at least one of (F1) a fibrous inorganic filler and (F2) a non-fibrous inorganic filler.

In one embodiment, the fibrous inorganic filler (F1) may include at least one of glass fiber, carbon fiber and metal fiber.

The fibrous inorganic filler (F1) may have an average fiber length (L) of about 1 mm to about 5 mm. For example, the average fiber length may be about 1, 1.2, 1.3, 1.4, 1.5, 2, 2.5, 3, 3.5, 4, 4.5 and 5 mm. Also, the fibrous inorganic filler (F1) may have a maximum aspect ratio of about 50 to about 300. As used herein, the term "aspect ratio" is defined as the length of the fibrous inorganic filler (F1) divided by the diameter of the fibrous inorganic filler (F1). In this range, the composition of the present invention may have excellent flowability, moldability, impact resistance and toughness.

In one embodiment, the non-fibrous inorganic filler (F2) may be at least one of talc, calcium carbonate, barium sulfate, glass bubbles and glass beads.

The non-fibrous inorganic filler (F2) may have a number-average particle size ranging from about 0.1 µm to about 5 µm. In this range, the composition of the present invention may have excellent dispersibility leading to excellent flowability and moldability, as well as excellent impact resistance and toughness. For example, the number-average particle size of the non-fibrous inorganic filler (F2) may be about 0.1, 0.2, 0.3, 0.4, 0.5, 1, 1.5, 2, 2.5, 3, 3.5, 4, 4.5 and 5 µm.

In one embodiment, the fibrous inorganic filler (F1) and the non-fibrous inorganic filler (F2) may be mixed at a weight ratio ranging from about 1:0.1 to about 1:2. In this range, the composition of the present invention may have excellent toughness and impact resistance.

In one embodiment, the inorganic filler (F) may be included in an amount of about 0.5 wt % to about 5 wt % based on the total weight of the long fiber-reinforced thermoplastic resin composition. If the inorganic filler (F) is included in amount of less than about 0.5 wt %, the heat resistance and toughness of the composition of the present invention can be reduced, and the molding cycle time of the composition can be increased, and if it is included in an amount of more than about 5 wt %, the processability and impact resistance of the composition can be reduced. For example, it may be included in an amount of about 1 wt % to about 5 wt %. For example, it may be included in amounts of about 0.5, 1, 1.5, 2, 2.5, 3, 3.5, 4, 4.5 and 5 wt %.

The composition of the present invention may further contain additives. Examples of the additives include an antioxidant and an antistatic agent, which are contained in suitable amounts. Examples of the antioxidant that may be used in the present invention include phenol-based antioxidants, phosphate-based antioxidants, thiodipropionate synergists, and the like. These additives and other additives can be easily selected by those skilled in the art.

A method for preparing the long fiber-reinforced thermoplastic resin composition having improved impact resistance, which includes the components as described above, is not limited to a particular method. Specifically, the method for preparing the long fiber-reinforced thermoplastic resin composition having improved impact resistance may be carried out using a melt-kneading machine such as a pultrusion machine, a Banbury mixer, a single-screw extruder, a twin-screw extruder or a multi-screw extruder at a kneading temperature of preferably 180° C. to 240° C. Methods of molding the long fiber-reinforced thermoplastic resin composition having improved impact resistance according to the present invention include, but are not limited to, extrusion molding, injection molding, sheet molding and the like.

Another aspect of the present invention relates to a molded article comprising the long fiber-reinforced thermoplastic resin composition having improved impact resistance.

In one embodiment, the molded article may have a number-average residual fiber length ranging from about 1.2 mm to about 5 mm. In this range, the composition may have excellent toughness and impact resistance. For example, the number-average residual fiber length may be about 1.2, 1.3, 1.4, 1.5, 1.6, 1.7, 1.8, 1.9, 2, 2.5, 3, 3.5, 4, 4.5 and 5 mm.

As used herein, the term "residual fiber length" means the length of fibers remaining in the molded article.

The molded article has excellent properties including excellent impact resistance and heat resistance while it has low specific gravity, and thus is lightweight and can be designed as thin films. This makes it possible to reduce the number of parts and simplify processes to thereby reduce costs and provide high economic efficiency. Accordingly, the molded article can be applied to various product groups.

The molded article can be applied to products that require high levels of impact resistance, mechanical properties and lightweight properties. In one embodiment, the molded article can be used in automotive parts such as automotive crash pads, which require high levels of impact resistance, rebound resilience, heat resistance and lightweight properties. Particularly, when the molded article is applied to an automotive crash pad, it will have an excellent function of deploying an invisible passenger airbag (PAB) or driver airbag (DAB), will have an excellent function of reducing head impact due to its improved impact resistance, and will increase fuel efficiency due to its lightweight efficiency.

In one embodiment, the number-average length of fibers remaining in the automotive crash pad may range from about 1.2 mm to about 5 mm. In this range, automotive crash pad can have the most suitable toughness and impact resistance. For example, the number-average length may be about 1.2, 1.3, 1.4, 1.5, 1.6, 1.7, 1.8, 1.9, 2, 2.5, 3, 3.5, 4, 4.5 and 5 mm.

Hereinafter, the present invention will be described with reference to examples. It is to be understood, however, that these examples are for illustrative purposes and are not intended to limit the scope of the present invention. The contents that are described herein can be technically analogized by those skilled in the art to which the present invention pertains, and thus the description thereof is omitted.

Examples 1 and 2 and Comparative Examples 1 to 5

For Examples 1 and 2 and Comparative Examples 1 to 5, the components as described below were prepared and mixed to one another at the ratios shown in Table 1 below, and the mixtures were extruded using a twin-screw extruder at a temperature of 190° C. to 230° C., followed by injection molding, thereby preparing long fiber-reinforced thermoplastic resins according to the present invention.

(A) Long fiber reinforcement: Glass fiber was used, which has a cross-sectional diameter of 10 μm and contains an aminosilane-based binder in an amount of 1.5 wt % based on the total weight of the long fiber reinforcement (A).

(B1) First ethylene-propylene copolymer: An ethylene-propylene copolymer was used, which has a melt index of 0.5 g/10 min, as measured at a temperature of 230° C. and a load of 2.16 kg, and contains ethylene in an amount of 12 wt % based on the total weight of the first ethylene-propylene copolymer.

(B2) Second ethylene-propylene copolymer: An ethylene-propylene copolymer was used, which has a melt index of 45 g/10 min, as measured at a temperature of 230° C. and a load of 2.16 kg, and contains ethylene in an amount of 12 wt % based on the total weight of the second ethylene-propylene copolymer.

(C1) First thermoplastic elastomer: A thermoplastic elastomer was used, which has a melt index of 2.0 g/10 min, as measured at a temperature of 230° C. and a load of 2.16 kg, and comprises an ethylene butene-1 copolymer (EBM).

(C2) First thermoplastic elastomer: A thermoplastic elastomer was used, which has a melt index of 10.0 g/10 min, as measured at a temperature of 230° C. and a load of 2.16 kg, and comprises an ethylene butene-1 copolymer (EBM).

(D1) Second thermoplastic elastomer: A thermoplastic elastomer was used, which has a melt index of 45 g/10 min, as measured at a temperature of 230° C. and a load of 2.16 kg, and comprises a styrene-diene copolymer.

(D2) Second thermoplastic elastomer: A thermoplastic elastomer was used, which has a melt index of 20 g/10 min, as measured at a temperature of 230° C. and a load of 2.16 kg, and comprises a styrene-diene copolymer.

(E) Functional group-grafted modified polypropylene resin: A functional group-grafted modified polypropylene resin was used, which comprises maleic anhydride grafted in polypropylene in an amount of 8 wt %.

(F1) Fibrous inorganic filler: Glass fiber having a number-average fiber length of 2 mm was used.

(F2) Non-fibrous inorganic filler: talc having a number-average particle size of 3 μm was used.

TABLE 1

| | | Examples | | Comparative Examples | | | | |
|---|---|---|---|---|---|---|---|---|
| | | 1 | 2 | 1 | 2 | 3 | 4 | 5 |
| (A) | | 20 | 18 | 3 | 26 | 15 | 21 | 18 |
| (B) | (B1) | 30 | 28 | 35 | 20 | 30 | 20 | 55 |
| | (B2) | 28 | 30 | 33.5 | 30 | 30 | 25 | — |
| (C) | (C1) | 10.5 | 10 | 12 | 10 | — | 15 | 12 |
| | (C2) | — | — | — | — | 12 | — | — |
| (D) | (D1) | 10 | 12 | 13 | 12 | — | 15 | 13 |
| | (D2) | — | — | — | — | 10.5 | — | — |
| (E) | | 0.5 | 0.5 | 1.5 | 0.5 | 1 | 1.5 | 2 |
| (F) | (F1) | 0.5 | 1 | 1 | 1 | 1 | 1.5 | — |
| | (F2) | 0.5 | 0.5 | 1 | 0.5 | 0.5 | 1 | — |
| Sum | | 100 | 100 | 100 | 100 | 100 | 100 | 100 |

(Unit: wt %)

Test Example

In order to examine the physical properties and processability of molded materials prepared from the long fiber-reinforced thermoplastic resins having improved impact resistance, prepared in Examples 1 and 2 and Comparative Examples 1 to 5, the following items were measured, and the results of the measurement are shown in Table 2 below.

(1) Specific gravity (g/cm$^3$): measured in accordance with ASTM D792.

(2) Tensile strength (kgf/cm$^2$): measured in accordance with ASTM D638 (measurement speed: 50 mm/min).

(3) Elongation (%): measured in accordance with ASTM D638.

(4) IZOD impact strength (kgf·cm/cm): measured in accordance with ASTM D256 using a ⅛" notch at room temperature and a temperature of −10° C.

(5) Flexural strength (kgf/cm$^2$): measured in accordance with ASTM D790 (measurement speed: 10 mm/min).

(6) Flexural modulus (kgf/cm$^2$): measured in accordance with ASTM D790.

(7) Heat deflection temperature (° C.): measured by applying a surface pressure of 1.82 MPa in accordance with ASTM D648.

(8) Rockwell hardness: measured in accordance with ASTM D785 (R-scale).

(9) Airbag deployment test: In accordance with Hyundai Motor Company ES84500-13 (passenger airbag invisible door performance specification), a passenger airbag (PAB) module was placed in a crash pad manufactured from each of the compositions of Examples 1 and 2 and Comparative Examples 1 to 5, and the inflator detonator was exploded by applying an electrical signal thereto at room temperature (21° C.), low temperature (−35° C.) and high temperature (85° C.), and whether the air bag was deployed through a seam line formed in the crash pad or whether crash pad pieces scattered during airbag deployment was examined, and the results were recorded as "Pass" or "Fail".

(10) Head impact test: In accordance with Article 88 (instrument panel) of the Rule on the Korean Automotive Safety Standards, a head model having a diameter of 165 mm and a weight of 6.8 kg was placed on a crash pad manufactured from each of the compositions of Examples 1 and 2 and Comparative Examples 1 to 5, and the head model was allowed to collide against the crash pad at a speed of 24.2 km/h (19.2 km/h for a passenger airbag). Whether the deceleration applied to the head model exceeded 80 times the gravitational acceleration continuously for 3/1000 seconds, and the results were recorded as "Pass" or "Fail".

(11) Number-average residual fiber length: A portion of a crash pad manufactured from each of the compositions of Examples 1 and 2 and Comparative Examples 1 to 5 was cut and heated in an electric furnace at a temperature between 500° C. and 600° C. for about 2-4 hours to remove the resin component, and 400 or more strands of the fiber components were extracted therefrom and measured with a fiber length distribution measuring instrument, and the number-average residual fiber length was calculated. As a result, it was shown that the number-average residual fiber lengths of the crash pads of Examples 1 and 2 and Comparative Examples 1 to 5 were all in the range from 1.2 mm to 5 mm.

TABLE 2

|  |  | Examples | | Comparative Examples | | | | |
| --- | --- | --- | --- | --- | --- | --- | --- | --- |
|  |  | 1 | 2 | 1 | 2 | 3 | 4 | 5 |
| Specific gravity (g/cm³) | | 1.03 | 1.04 | 1.02 | 1.16 | 1.05 | 1.08 | 1.07 |
| Tensile strength (kgf/cm²) | | 809 | 795 | 220 | 1,100 | 770 | 690 | 680 |
| Elongation (%) | | 5.5 | 4.5 | 20 | 22 | 7.2 | 6.8 | 6.2 |
| IZOD impact strength | 25° C. | 35 | 35 | 14 | 29 | 26 | 28 | 27 |
| (kgf · cm/cm) | −10° C. | 25 | 23 | 12 | 22 | 21 | 20 | 21 |
| Flexural strength (kgf/cm²) | | 930 | 910 | 870 | 890 | 860 | 815 | 795 |
| Flexural modulus (kgf/cm²) | | 36,000 | 35,500 | 24,500 | 34,500 | 32,200 | 30,500 | 27,950 |
| Heat deflection temperature (° C.) | | 160 | 161 | 132 | 124 | 134 | 126 | 130 |
| Rockwell hardness | | 109 | 102 | 101 | 102 | 101 | 100 | 98 |
| Airbag deployment test | Room temperature (21° C.) | Pass | Pass | Pass | Fail | Pass | Pass | Pass |
| | Low temperature (−35° C.) | Pass | Pass | Pass | Fail | Pass | Fail | Pass |
| | High temperature (80° C.) | Pass | Pass | Fail | Fail | Fail | Fail | Fail |
| Head impact test | | Pass | Pass | Fail | Pass | Pass | Fail | Fail |

As can be seen from the results in Table 2 above, in the case of Examples 1 and 2, the airbag was normally deployed without scattering of the crash pad or deviation from the seam line, and the crash pad had an excellent function of reducing head impact. However, in the case of Comparative Examples 1 to 5 which do not include the components of the present invention or are out of the content range or melt index range of the present invention, the specific gravities were higher than those of Examples 1 and 2, or the physical properties such as impact resistance and modulus were lower than those of Examples 1 and 2, and the airbag was deployed out of the seam line or the crash pad pieces scattered during airbag deployment, and the function of reducing head impact was reduced.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A long fiber-reinforced thermoplastic resin composition having improved impact resistance, the composition comprising:

(A) About 10 wt % to about 23 wt % of a long fiber reinforcement;
(B) About 50 wt % to about 77 wt % of an ethylene-propylene copolymer;
(C) About 5 wt % to about 18 wt % of a first thermoplastic elastomer having a melt index of about 1.0 g/10 min to about 5.0 g/10 min, as measured at a temperature of 230° C. and a load of 2.16 kg;
(D) About 5 wt % to about 18 wt % of a second thermoplastic elastomer having a melt index of about 30 g/10 min to about 60 g/10 min, as measured at a temperature of 230° C. and a load of 2.16 kg;
(E) About 0.05 wt % to about 7 wt % of a functional group-grafted modified polypropylene resin; and
(F) About 0.5 wt % to about 5 wt % of an inorganic filler, wherein each of the first thermoplastic elastomer (C) and the second thermoplastic elastomer (D) includes at least one of a copolymer of ethylene with an alpha-olefin having 4 or more carbon atoms, and a styrene-diene copolymer.

2. The long fiber-reinforced thermoplastic resin composition of claim 1, wherein the ethylene-propylene copolymer (B) is a mixture of (B1) a first ethylene-propylene copolymer having a melt index of about 0.1 g/10 min to about 2.0 g/10 min, as measured at a temperature of 230° C. and a load of 2.16 kg, and (B2) a second ethylene-propylene copolymer having a melt index of about 30 g/10 min to about 60 g/10 min, as measured at a temperature of 230° C. and a load of 2.16 kg.

3. The long fiber-reinforced thermoplastic resin composition of claim 1, wherein the long fiber reinforcement (A) is at least one selected from among glass fiber, carbon fiber, polymer fiber, basalt fiber, natural fiber and metal fiber.

4. The long fiber-reinforced thermoplastic resin composition of claim 1, wherein the long fiber reinforcement (A) contains about 1 wt % to about 3 wt % of a binder.

5. The long fiber-reinforced thermoplastic resin composition of claim 2, wherein each of the first ethylene-propylene copolymer (B1) and the second ethylene-propylene copolymer (B2) contains about 10 wt % to about 15 wt % of ethylene.

6. The long fiber-reinforced thermoplastic resin composition of claim 2, wherein the first ethylene-propylene copolymer (B1) and the second ethylene-propylene copolymer (B2) are included at a weight ratio of about 1:0.5 to about 1:3.

7. The long fiber-reinforced thermoplastic resin composition of claim 1, wherein the first thermoplastic elastomer (C)

and the second thermoplastic elastomer (D) are included at a weight ratio of about 1:0.5 to about 1:3.

8. The long fiber-reinforced thermoplastic resin composition of claim 1, wherein the functional group in the functional group-grafted modified polypropylene resin (E) is at least one of unsaturated carboxylic acid, unsaturated carboxylic acid derivatives and organosilane compounds.

9. The long fiber-reinforced thermoplastic resin composition of claim 1, wherein the functional group-grafted modified polypropylene resin (E) has a graft ratio of about 5 wt % to about 15 wt %.

10. The long fiber-reinforced thermoplastic resin composition of claim 1, wherein the organic filler (F) comprises at least one of (F1) a fibrous inorganic filler and (F2) a non-fibrous inorganic filler, wherein the fibrous inorganic filler (F1) comprises at least one of glass fiber, carbon fiber and metal fiber, which have a number-average fiber length (L) of about 1 mm to about 5 mm, and the non-fibrous inorganic filler (F2) comprises at least one of talc, calcium carbonate, barium sulfate, glass bubbles and glass beads, which have an average particle size of about 0.1 μm to about 5 μm.

11. A molded article comprising a long fiber-reinforced thermoplastic resin composition having improved impact resistance according to claim 1.

12. The molded article of claim 11, wherein fiber remaining in the molded article has a number-average residual fiber length of about 1.2 mm to about 5 mm.

13. The molded article of claim 11, wherein the molded article is an automotive crash pad.

14. The molded article of claim 13, wherein fiber remaining in the automotive crash pad is a number-average residual fiber length of about 1.2 mm to about 5 mm.

* * * * *